United States Patent Office 3,011,300
Patented Dec. 5, 1961

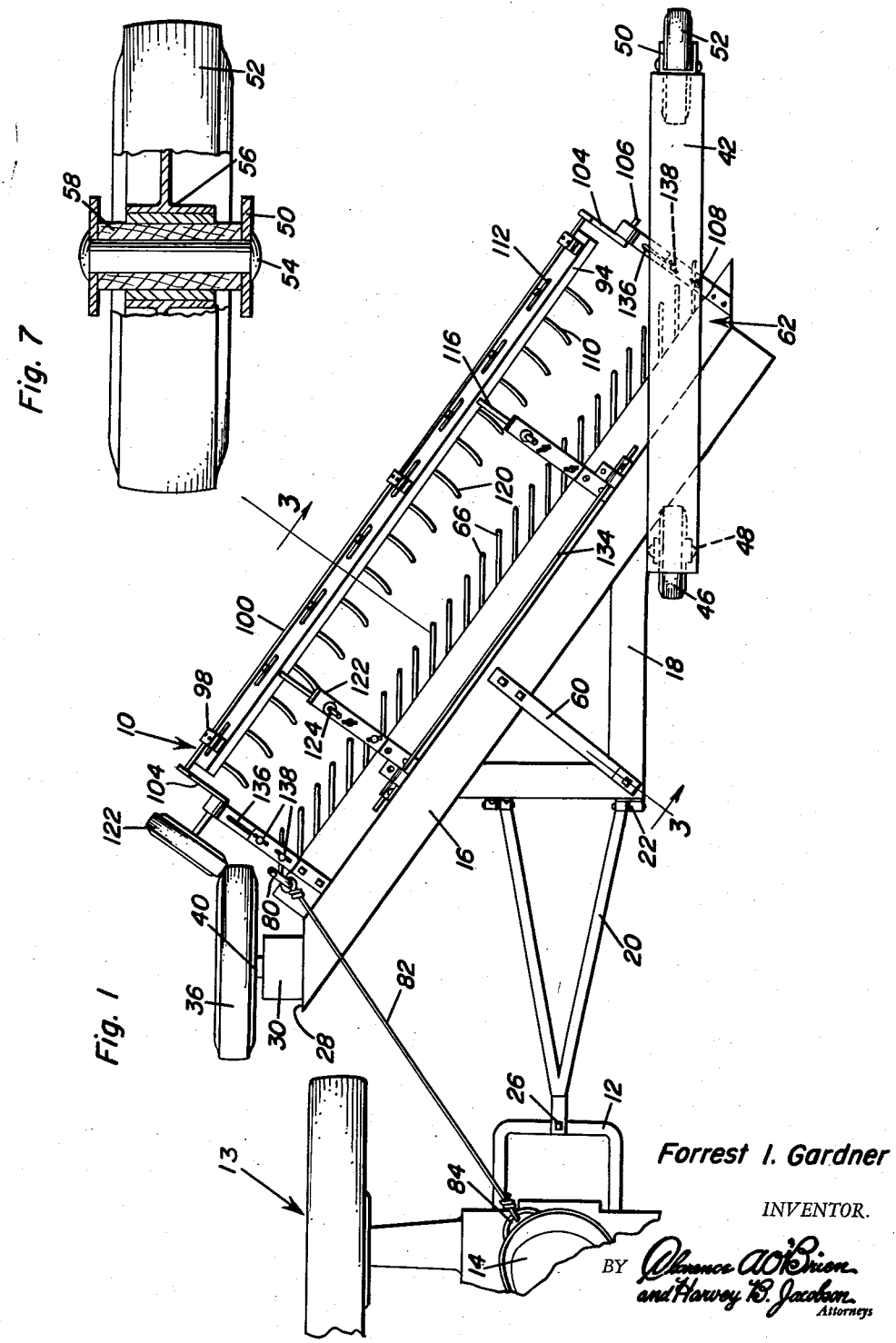

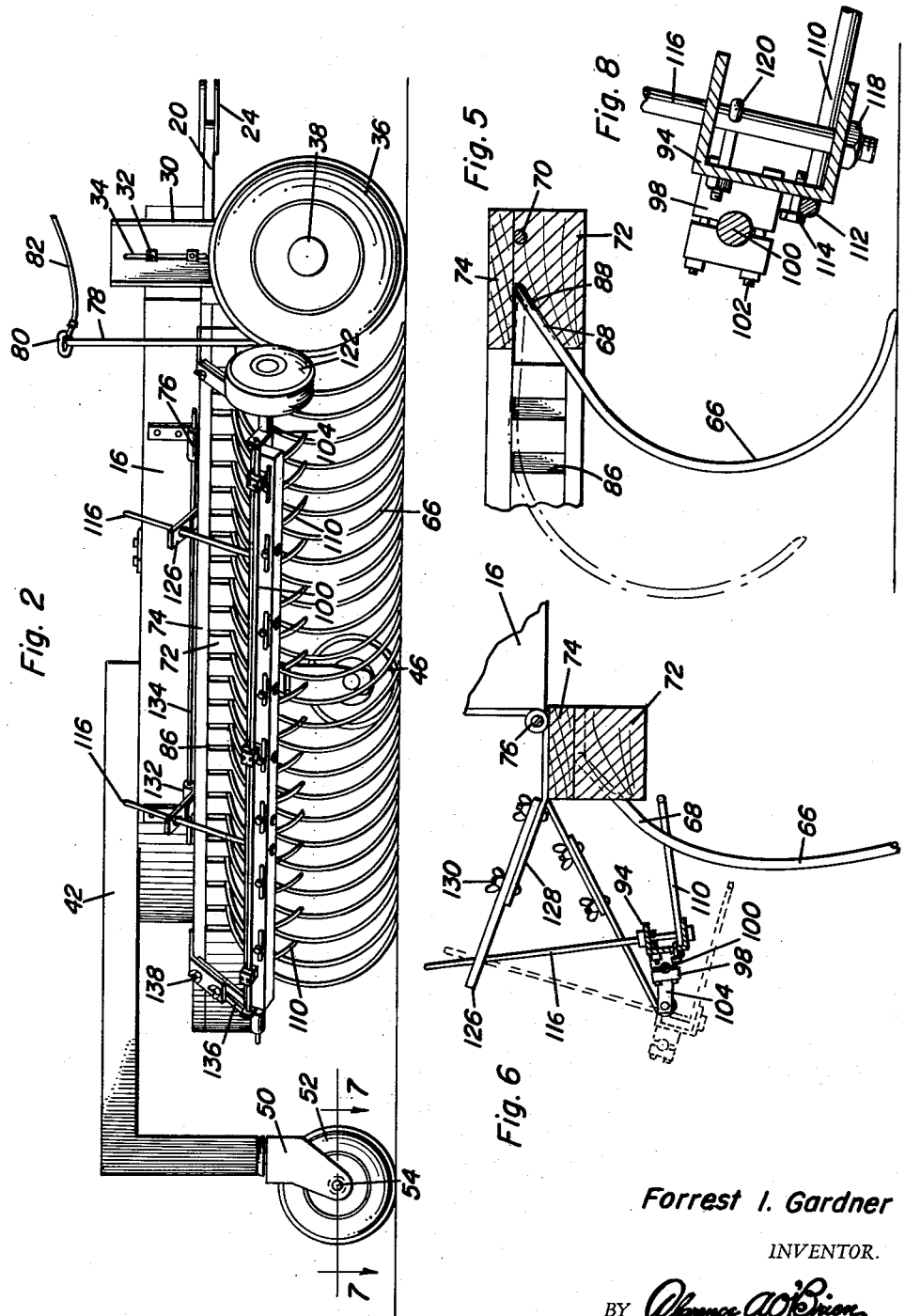

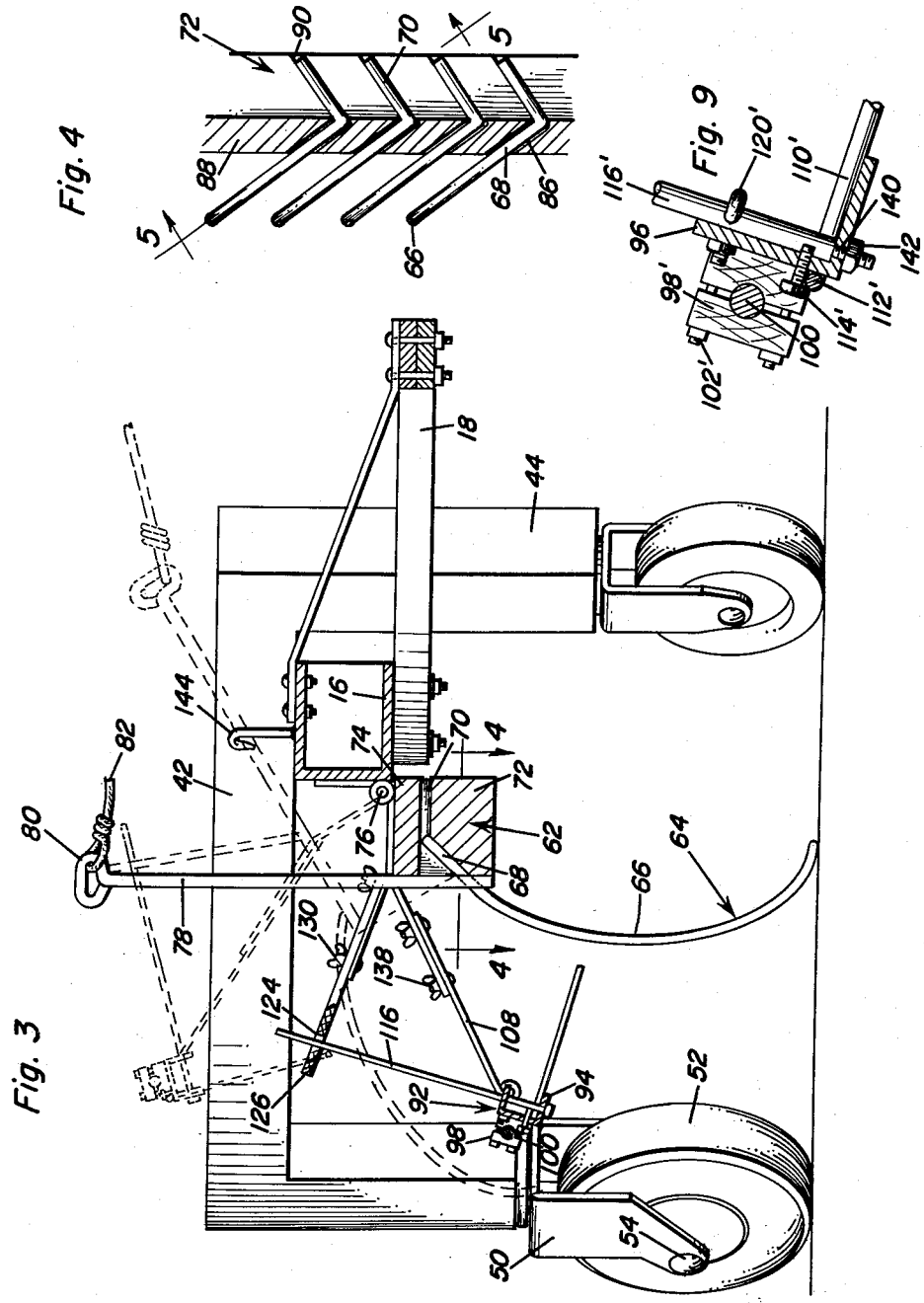

3,011,300
SIDE DELIVERY HAY RAKE
Forrest I. Gardner, Morriston, Fla.
Filed Apr. 16, 1959, Ser. No. 806,810
10 Claims. (Cl. 56—376)

The present invention generally relates to a side delivery hay rake having novel structural features which enable the rake to be effectively employed for raking areas of rough terrain which may have rocks or other obstructions therein without damaging the hay rake while yet permitting effective raking of the area together with other features which somewhat lifts and lightens or fluffs the roll of hay as it moves laterally of the hay rake and is discharged into a windrow thereby facilitating curing of the hay for subsequent baling.

The primary object of the present invention is to provide a side delivery hay rake incorporating a generally horizontal frame or beam supported by supporting wheels for movement along a line of travel with the longitudinal axis of the supporting beam arranged in angular relation to the path of travel and with the beam supporting a plurality of raking teeth or tines for rolling the hay forwardly and laterally and discharging the same at the rearmost end of the hay rake into a windrow.

Another object of the present invention is to provide a hay rake in accordance with the preceding object in which the teeth are freely pivotally mounted on the supporting beam for elevational movement within certain limits with the teeth being constructed of spring steel so that the teeth may ride over obstructions such as rocks when engaging the same and immediately fall back into engagement with the ground surface thereby preventing damage to the rake and teeth while yet permitting the teeth to effectively completely rake a given area.

A further object of the present invention is to provide a side delivery hay rake in accordance with the immediately preceding objects in which the entire supporting beam is pivotal about an axis generally paralleling its longitudinal axis for raising all of the rake teeth out of engagement with the ground surface for dumping the hay roll formed thereby but primarily for permitting transport of the hay rake over the row.

Yet another object of the present invention is to provide a side delivery hay rake incorporating a plurality of fingers mounted on an eccentrically supported shaft movable in a path for projecting between the main raking teeth and engaging the hay roll and moving the same forwardly and upwardly and then dropping the same back into engagement with the rake teeth with the lifting fingers being driven by friction wheel engagement with an enlarged supporting wheel for the rake.

A still further important feature of the present invention is to provide a hay rake construction in which all of the bearing points are provided with wood bearings which have been impregnated or saturated with lubricant which reduces the wear on the various movable components and reduces the necessity of lubriating the bearings and prolongs the useful life of the rake.

Yet another object of the present invention is to provide a side delivery hay rake which is simple in construction, easy to repair, dependable in operation, effective for its particular purposes, especially useful in rough and rocky terrain, easy to use and generally inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a plan view of the hay rake of the present invention;

FIGURE 2 is a side elevation of the hay rake and viewing the rear of the raking teeth;

FIGURE 3 is a transverse sectional view taken substantially upon a plane passing along section line 3—3 of FIGURE 1 illustrating the details of construction of the components of the rake;

FIGURE 4 is a transverse, plan sectional view taken substantially upon a plane passing along section line 4—4 of FIGURE 3 illustrating the details of the mounting means for the main raking teeth;

FIGURE 5 is a sectional view taken substantially upon a plane passing along section line 5—5 of FIGURE 4 illustrating further details of the mountings for the teeth;

FIGURE 6 is a partial sectional view similar to a portion of FIGURE 3 and illustrating the movement of the lifting fingers which project through the main teeth;

FIGURE 7 is a detailed sectional view taken substantially upon a plane passing along section line 7—7 of FIGURE 2 illustrating one of the wood bearings for the wheels;

FIGURE 8 is a detailed sectional view of the finger supporting frame member illustrating the structure thereof; and FIGURE 9 is a detailed sectional view similar to FIGURE 8 but illustrating another embodiment of the finger supporting frame member.

Referring now specifically to the drawings, the numeral 10 generally designates the side delivery hay rake of the present invention which is adapted to be attached to a drawbar 12 of a conventional farm tractor generally designated by the numeral 13 and which is provided with the usual operator's seat 14.

The hay rake 10 includes an elongated horizontally disposed frame member or support beam 16 having a longitudinal axis arranged in oblique angular relation to the path of movement of the tractor and the path of movement of the hay rake. A generally right triangular frame or support member is 18 is attached to the frame member 16 and a pair of converging members 20 are attached to the right triangular frame 18 by hinge pins or hinge assemblies 22. The converging members 20 cooperate to form a tongue having a pair of spaced vertical plates 24 at the forward ends thereof for receiving the drawbar 12 therebetween whereby a hitch pin 26 is inserted through the aligned apertures in the plates 24 and in the drawbar 12 for attaching the hay rake to the drawbar.

One end of the elongated frame member 16 is provided with a surface 28 parallel to the path of movement of the hay rake with a vertical support member 30 being secured thereto in an adjustable mannerly by fastening bolts 32 extending through a vertical slot 34 in the support member 30. The lower end of the support member 30 is provided with an enlarged support wheel 36 which includes a hub 38 journaled on a suitable axle 40.

The other end of the frame member 16 is provided with an inverted U-shaped support member 42 rigidly affixed to the frame member 16 by any suitable means with a forward depending leg 44 of the support member 42 having a relatively small caster wheel 46 journaled thereon by an axle 48. The rear end of the inverted U-shaped support member 42 is provided with an inverted U-shaped yoke 50 supporting a caster wheel 52 on an axle 54. The yoke 50 is provided with an upwardly extending shank rotatably received in the vertical leg of the support member 42 for rotation about a vertical axis thereby enabling arcuate swinging movement of the rear portion of the hay rake without chatter by virtue of the diameter of the caster wheel 52 and the mounting of the yoke 50. The caster wheel 52 is provided with the usual hub 56 which receives the axle or pin 54 and a wood bearing 58 is provided on the pin or axle 54 and the wood bearing is such that it has been impregnated with a lubricating oil or the like which not only provides adequate bearing surface for the wheel but also reduces the wear of the component parts such as would occur under the dusty conditions were metal bearings used. Also, the right triangular frame member 18 is braced by a brace member 60 extending from the frame member 16 to the triangular frame 18. The frame member 16 may be considered a supporting beam and may be of solid wood construction or may be of structural steel or lightweight metal such as a channel iron as is illustrated in the drawings. Also, the inverted U-shaped support member 42 may be in the form of solid wood components securely attached to each other or may be in the form of an inverted U-shaped arch constructed of hollow metal pipe or the like. The entire structure mentioned previously may be considered a mobile frame and the bearings for each wheel are preferably wood for long life.

Secured to the frame member 16 is an elongated support beam generally designated by the numeral 62 which supports a plurality of main rake teeth generally designated by the numeral 64. Each of the raking teeth 64 includes a semi-circular portion 66 and a generally straight portion 68 terminating in a perpendicular terminal end portion 70. As illustrated in FIGURE 1, each of the rake teeth 64 are mounted in a plane paralleling the path of movement of the rake for vertical swinging or pivotal movement in such a plane and the plurality of rake teeth taken together will form a generally semi-cylindrical raking surface which will cause the hay that is raked to roll forwardly and laterally thereby providing and forming a hay roll to be discharged from the hay rake in the usual manner.

The support beam 62 includes an elongated lower member 72 and a removable upper member 74 removably secured thereto. The support beam 62 is pivotally attached to the frame member 16 by hinge assemblies 76 which may be in the form of aligned eye members with an elongadte rod extending therethrough or two independent shorter rods whereby the supporting beam 62 may be pivoted upwardly by employing an upstanding rod 78 attached thereto which has the upper end 80 formed as a loop for receiving a flexible pull rope 82 which may terminate at its other end adjacent the tractor operator's seat 14 and may even be tied to a loop 84 whereby the elongated rod may be pulled forwardly and downwardly for pivoting the support beam 62 upwardly about hinge assemblies 76 thereby raising the rake teeth 64 out of contact with the ground surface.

The rear edge of the lower member 72 is provided with a plurality of slots 86 therein with the bottom of each slot being inclined as indicated by the numeral 88 and terminating just below the upper surface of the lower member 72 with the terminal end of the inclined ramp 88 having a cylindrical groove 90 communicating therewith which receives the offset end 70 of the tooth 62 with the straight portion 68 being received in the slots 86. The bottom of the slot 86 limits downward movement of the hay rake teeth while the cover member 74 limits upward movement thereof but the cover 74 may be removable for repair or replacement of the raking tines 66.

Thus, when the rake is raking a surface and any of the rake teeth 64 engage a stationary obstruction such as a rock, stump or an outcropping formation, the rake teeth may move or swing upwardly thereby enabling passing of the rake over such an obstruction without damaging the rake teeth involved with the free pivoting and swinging action effecting immediate return of the rake teeth to operative position in engagement with or in adjacent relationship to the ground surface.

Supported rearwardly of and in spaced parallel relation to the beam 62 is a finger supporting beam generally designated by the numeral 92 which preferably in the form of a structural metal member such as a channel shaped member illustrated in FIGURE 8 designated by the numeral 94 but could be in the shape of an angle iron as indicated by the numeral 96 in FIGURE 9. The channel shaped member 94 is provided with a plurality of split wood bearings 98 on the outer surface thereof with the wood bearings journalling an elongated shaft 100 therein and being secured to the channel shaped member 94 by bolts 102. The ends of the shaft 100 are provided with an offset or laterally extending plate 104 which projects slightly on all sides of the shaft 100 but which extends laterally therefrom and terminates in a bearing portion, offset member of stub shaft 106 journaled in the terminal ends of a pair of brackets 108 secured to and supported from the finger supporting beam 92.

Carried by the finger supporting beam 94 is a plurality of U-shaped rod members forming fingers 110 which have the bight portion 112 lying against the outer surface of the web of the channel shaped member 94 and being held in position by stud bolts 114 having the head thereof engaging the bight portion 112 and being threaded into the bight portion of the beam 94.

Extending vertically through the flanges of the channel shaped member 94 is a pair of elongated guide rods 116 extending through the flanges with the lower end thereof being threaded and provided with a nut 118. A J-bolt 120 is used to lock the rods 116 in position. Also, the inner ends of the tines or fingers are slightly bent laterally as indicated by the numeral 122 so that as they go in between the main rake teeth 64, the ends thereof will generally guide the fingers during movement thereof.

One end of the offset members 106 is provided with a friction wheel 122 affixed thereto which is in frictional contact with the enlarged wheel with the enlarged wheel 36 thereby driving the eccentric shaft 100 and causing the finger supporting beam 92 to move in a circular path thus causing the fingers 102 to project between the rake teeth 64 for engaging the hay roll in the front thereof for lifting the hay roll and generally fluffing the hay roll and discharging the same through the discharge end of the device.

Means is provided for controlling the path of movement of the fingers 110 and this means includes the pair of upwardly extending rods 116 which slidably extend through enlarged openings 124 in a wood guide member 126 adjustably supported on and by a slotted bracket 128 by use of wing nuts and bolts 130. The bracket 128 is provided with an eye member 132 pivotally received on the elongated rod 134 forming a part of the hinge assembly 76 with the flat of the bracket 128 engaging the top of the beam 62 whereby the finger supporting beam 92 will be elevated along with the teeth supporting beam 62 when the elongated handle or rod 78 is moved forwardly thus disconnecting the friction wheel 122 from the drive wheel 36. Also, it is noted that the brackets 108 which support the stub shafts 106 are longitudinally adjustable by provision of a sectional overlapping bracket construction having slots 136 and wing bolts and nuts 138 enabling the orientation of the finger supporting beam 92 and the teeth supporting beam 62 to be varied and adjusted to the maximum efficiency position so that the fingers will project through the tines and move forwardly and upwardly generally in a circular path of movement for engaging the hay roll and lifting the same upwardly and slightly forwardly and then dropping the same back onto engagement with the inner surface of the teeth for causing lightening or fluffing of the hay roll and at the same time assisting in the movement of the hay roll laterally of the teeth.

FIGURE 9 illustrates another embodiment of the finger supporting beam 92 in which an angle iron member 96 is provided. The plurality of split wooden bearings 98' are supported thereon in the usual manner by the bolts 102'. The fingers 110' extend through the vertical flange of the angle iron member 96 and the bight portion 112' is held by the headed and threaded stud 114'. The vertically extending guide rods 116 are disposed alongside of the inner surface of the vertical flange of the angle iron member 96 and terminate in a reduced threaded end portion 140 which provides a shoulder for engagement with the upper surface of the bottom flange of the angle iron member 96. A nut 142 is provided on the threaded stud 140 and locks the vertical rods 116' to the angle iron member 96 with the assistance of the short J-bolts 120'. The operation of the guide rods 116 is the same as in the device illustrated in FIGURE 8 with the device shown in FIGURE 9 being simpler and preferred with the weight of the angle iron member being less than the channel shaped member.

The frame member 16 is provided with an upwardly extending and downwardly opening hook 144 thereon for engagement with the rod 78 for holding the teeth supporting beam 62 and the finger supporting beam 92 in elevated position during transport. This may be accomplished by the tractor operator pulling on the flexible line 82 when causing the rod 78 to flex under the hook 144. When it is desired to release the rod 78, it is only necessary to push further downwardly on the flexible member 82 and then cause lateral movement of the rod 78 out from under the hook 144.

The construction of the device is such that all of the component parts are readily accessible with it being noted that the fingers are replaceable by merely removing a single retaining bolt such as the stud 114, while the teeth 64 are replaceable by merely elevating the top member 74 sufficiently to enable another tooth to be slipped into position. The various dimensions may vary and the material of which the device is to be constructed may vary and all of the component parts receiving wear may be readily replaced.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A side delivery hay rake comprising a mobile wheeled frame, said frame including an elongated frame member disposed in oblique angular relation to the path of movement of the hay rake, an elongated support beam mounted on said frame member for pivotal movement about an axis generally paralleling the longitudinal axis of the frame member, a plurality of arcuately curved raking teeth freely pivotally supported on said beam for pivotal movement about an axis generally perpendicular to the path of movement whereby the raking teeth may swing upwardly upon engagement with an obstruction and will subsequently return to raking position by gravity, each of said raking teeth being disposed in a vertical plane generally paralleling the path of movement of the hay rake, and means forming a part of said beam for limiting the elevational movement of the raking teeth.

2. A side delivery hay rake comprising a mobile wheeled frame, said frame including an elongated frame member disposed in oblique angular relation to the path of movement of the hay rake, an elongated support beam mounted on said frame member for pivotal movement about an axis generally paralleling the longitudinal axis of the frame member, a plurality of arcuately curved raking teeth supported on said beam for pivotal movement about an axis generally perpendicular to the path of movement whereby the raking teeth may swing upwardly upon engagement with an obstruction and will subsequently return to raking position by gravity, each of said raking teeth being disposed in a vertical plane generally paralleling the path of movement of the hay rake, and means forming a part of said beam for limiting the elevational movement of the raking teeth, each of said hay raking teeth including a semi-circular portion having the lower end thereof in raking engagement with the ground surface, the other end of each tooth remote from the raking end having a laterally extending projection, said supporting beam including a generally triangular shaped slot in the upper edge thereof with the inner end of the slot terminating adjacent the upper surface of the beam and communicating with a groove in the upper surface thereof for receiving the lateral projection, and a removable cover member overlying the beam and retaining the later projection in the groove and the adjacent portion of the teeth in the triangular slots for limiting the movement of the teeth and for retaining the teeth on the beam.

3. The combination of claim 2 wherein said beam is provided with an upstanding rod rigid therewith with the upper end of the rod having a rigid loop, a flexible line connected to the loop whereby the beam may be pivoted about the axis of support for elevating the rear edge thereof thereby elevating the teeth to a raised inoperative position.

4. A side delivery hay rake comprising a mobile wheeled frame, said frame including an elongated frame member disposed in oblique angular relation to the path of movement of the hay rake, an elongated support beam mounted on said frame member for pivotal movement about an axis generally paralleling the longitudinal axis of the frame member, a plurality of arcuately curved raking teeth supported on said beam for pivotal movement about an axis generally perpendicular to the path of movement whereby the raking teeth may swing upwardly upon engagement with an obstruction and will subsequently return to raking position by gravity, each of said raking teeth being disposed in a vertical plane generally paralleling the path of movement of the hay rake, and means forming a part of said beam for limiting the elevational movement of the raking teeth, a finger supporting beam carried by the teeth supporting beam, an elongated shaft rotatable on the finger supporting beam and having eccentric stub shafts rigid with the outer ends thereof with the stub shafts forming the support for the finger supporting beam, one of said stub shafts having a friction wheel connected thereto and frictionally engaging one of the wheels on the wheeled mobile frame for driving the finger supporting beams in a circular path with the shaft, means interconnecting the finger supporting beam and the teeth supporting beam for guiding the movement of the finger supporting beam, and a plurality of finger means mounted on the finger supporting beam and projecting forwardly therefrom for projection through and between the teeth during a portion of the circular movement of the finger supporting beam.

5. The structure as defined in claim 4 wherein said guide means includes rearwardly extending strap brackets carried by the teeth supporting beam with the outer ends of each bracket having an enlarged opening therein and being constructed of wood, an elongated rod rigidly attached to the finger supporting beam and slidably and pivotally received in the opening in each of the strap brackets for orientating the finger supporting beam during the movement thereof in a circular path.

6. The structure as defined in claim 5 wherein each of said finger means includes a generally U-shaped rod member including a pair of spaced fingers projecting through the beam and extending forwardly with the free end thereof being disposed at a slight angle for assuring that the fingers will not bend the teeth, the bight portion of said U-shaped rod being disposed against the outer surface of the finger supporting beam and being removably held therein by a removable threaded stud.

7. The structure as defined in claim 6 wherein said finger supporting beam is of angle iron construction with the two fingers of each U-shaped rod lying against the upper surface of one flange of the angle iron and with the upstanding rods lying against the other surface and being held rigidly thereto by a J-bolt, each rod having a reduced threaded longitudinal extension, the horizontal flange of the angle iron having apertures receiving the extensions, and a nut on each threaded extension for securing the rod to the beam.

8. The structure as defined in claim 7 wherein a plurality of split wooden bearings are provided on the outer surface of the vertical flange of the angle iron member for rotatably receiving said shaft.

9. The structure as defined in claim 8 wherein said wheels on the mobile frame are provided with wood bearings.

10. In a side delivery hay rake of the type having teeth arranged in an inclined path for forming a hay roll and moving the same laterally for discharge into a windrow, that improvement comprising an elongated beam adapted to be supported from the hay rake rearwardly of the teeth and driven thereby in a circular path, a plurality of projecting fingers carried by the beam for extension between the teeth of the hay rake for effectively raising the hay roll thereby rendering the same more fluffy and light for better drying and subsequent baling with the pick-up baler.

References Cited in the file of this patent
UNITED STATES PATENTS

| | | |
|---|---|---|
| 353,799 | McPherson | Dec. 7, 1886 |
| 381,699 | Johnson | Apr. 24, 1888 |
| 1,134,171 | Weaver | Apr. 6, 1915 |